United States Patent

[11] 3,540,622

| [72] | Inventor | Steve Spisak<br>Elyria, Ohio |
|---|---|---|
| [21] | Appl. No. | 736,676 |
| [22] | Filed | June 13, 1968 |
| [45] | Patented | Nov. 17, 1970 |
| [73] | Assignee | By mesne assignments to TRW Inc.,<br>Cleveland, Ohio, a corporation of Ohio |

[54] PART-FEEDING APPARATUS
10 Claims, 7 Drawing Figs.

[52] U.S. Cl. ........................................... 221/233,
221/278
[51] Int. Cl. ......................................... B65h 5/00
[50] Field of Search ............................... 221/241,
272, 278, 233

[56] References Cited
UNITED STATES PATENTS

| 3,161,274 | 12/1964 | Lanz | 221/278 |
| 3,422,597 | 1/1969 | Beer | 221/278X |

Primary Examiner—Stanley H. Tollberg
Attorneys—Philip E. Parker, James R. O'Connor, John Todd, Hall and Haughton and Gordon Needleman ABSTRACT: An escapement for fastener-feeding apparatus is capable of feeding a number of different types and sizes of fasteners, and specifically welding studs, without requiring complicated mechanism. The escapement also has a unique interlock which prevents studs from being accidentally propelled when the feed tube through which the studs are supplied to a welding tool is disconnected from the escapement.

Patented Nov. 17, 1970
3,540,622
Sheet 1 of 2
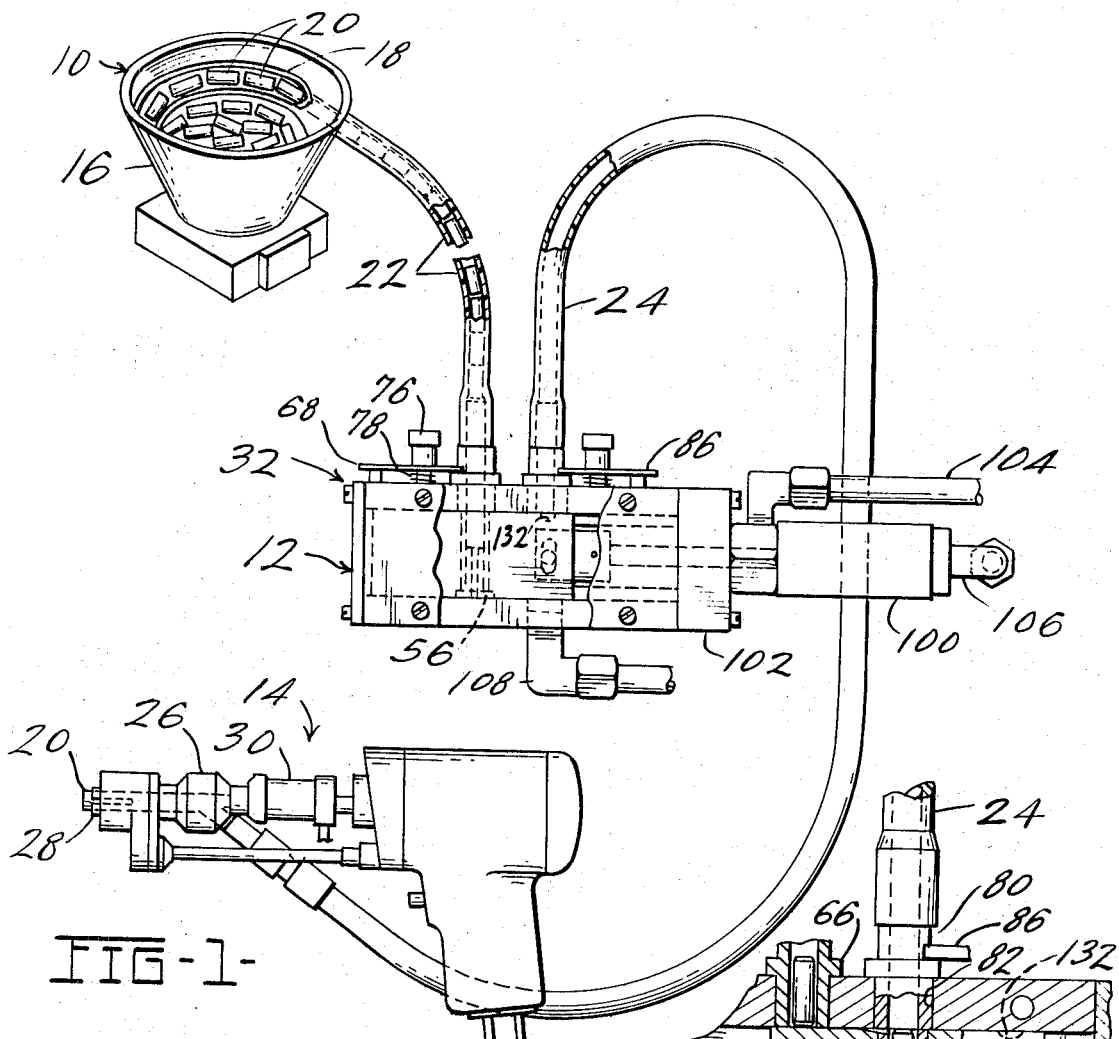
FIG-1-
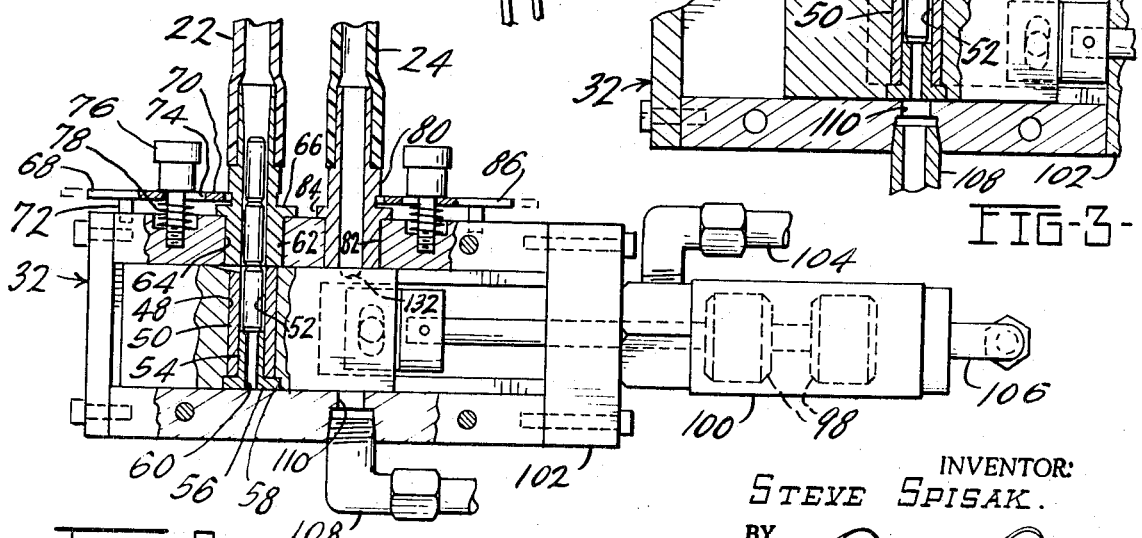
FIG-2-
FIG-3-
INVENTOR:
STEVE SPISAK.
BY
ATT'YS.

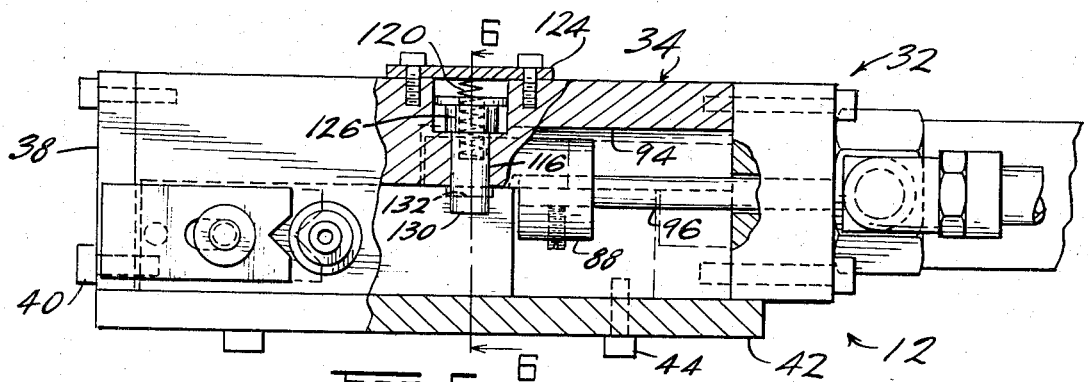
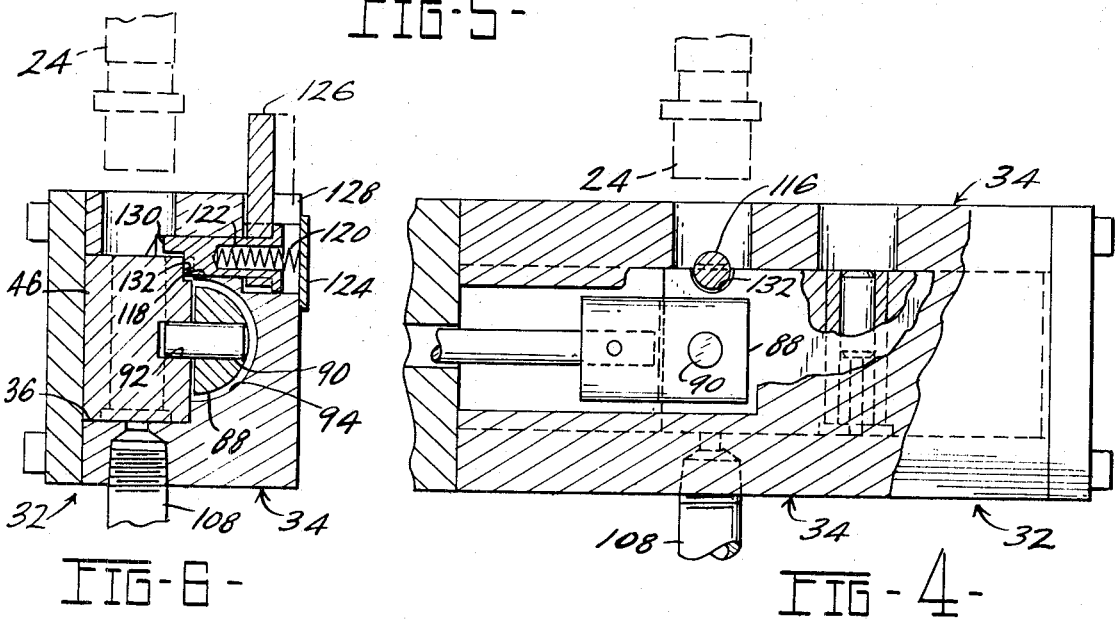
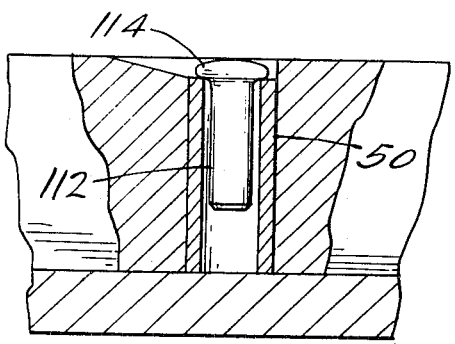
INVENTOR:
STEVE SPISAK.

PART-FEEDING APPARATUS

This invention relates to part-feeding apparatus and more particularly to an escapement mechanism for fastener-feeding apparatus.

Studs are now commonly fed to welding tools by substantially automatic feeding systems. A supply of studs are maintained in a hopper in which they are oriented and then fed to a supply track or tube. From here they are transferred one at a time by an escapement mechanism to a feed tube through which they are blown to a chuck of the stud welding tool. In many commercial applications, it is desirable to use different sizes and types of studs for different applications from time to time. However, most feeding systems and particularly escapements heretofore have been capable of handling only one size and style of stud. Where escapements have been able to handle different lengths of studs, they have employed relatively complicated mechanisms to accomplish this.

The present invention provides apparatus for feeding parts and particularly an escapement for use in feeding studs, which escapement can handle different types and styles of studs yet without requiring complicated components to achieve this. Toward this purpose, the escapement is designed so that the studs are received in a shuttle of the escapement and propelled from the same side of the escapement. With this arrangement, an opening in the shuttle of the escapement contains a filler or insert member of a particular length so that ends of studs supplied into the opening are flush with the surface of the shuttle. Hence, studs supplied to the shuttle can be in end-to-end contact without the requirement of special fingers, articulated stops, or the like to control the supplying of the studs to the shuttle. When the shuttle transfers the stud to a position in alignment with the feed tube, air can then be blown through a passage in the insert member to propel the stud to the tool. Consequently, the only air required is that needed to actuate the shuttle and to propel the studs through the feed tube. Further, the only moving elements involved are the shuttle and drive means for operating the shuttle. The escapement can be quickly disassembled to change the insert member to accommodate different lengths of studs. The escapement also can be used with studs having flanged ends, in which case the studs are fed to the shuttle with the flanged end up and are suspended in the shuttle opening by the flanges which need not enter the shuttle openings as the studs do not have to pass therethrough.

The new escapement also is provided with a unique safety lock which prevents the possibility of a stud from being propelled by the escapement at an inopportune time. Specifically, the escapement has a locking member which engages the shuttle and prevents it from moving from a position in communication with the supply tube when the feed tube is disconnected. A spring is used to urge the locking member into the path of the shuttle but the feed tube has a fitting which engages a portion of the locking member and normally holds it out of the path of the shuttle. However, the locking member moves into engagement with the shuttle to prevent its operation whenever the feed tube fitting is disconnected. Hence, a stud cannot be dangerously propelled when the feed tube is not in place.

It is, therefore, a principal object of the invention to provide a simplified escapement capable of feeding parts of different sizes and types.

Another object of the invention is to provide an escapement in which the parts are supplied to and propelled from the same side thereof and in generally opposite directions.

Yet a further object of the invention is to provide an escapement having a safety lock which prevents parts from being propelled at undesirable times.

Many other objects and advantages of the invention will be apparent from the following detailed description of a preferred embodiment thereof, reference being made to the accompanying drawings, in which:

FIG. 1 is a somewhat schematic view in elevation, with parts broken away, of stud feeding apparatus and a stud welding tool;

FIG. 2 is an enlarged view in elevation, with parts broken away and with parts in section, of an escapement mechanism constituting part of the feeding apparatus of FIG. 1;

FIG. 3 is a fragmentary view in cross section showing the escapement mechanism with a shuttle in another position;

FIG. 4 is a rear view, with parts broken away and with parts in section, of the escapement, with the shuttle in the position of FIG. 2;

FIG. 5 is a top view of the escapement, with parts broken away and with parts in section, with the shuttle in the position of FIG. 2;

FIG. 6 is a view in vertical section taken along the line 6–6 of FIG. 5; and

FIG. 7 is a fragmentary view of a portion of the escapement, with a modified, flanged fastener held in the shuttle.

The feeding system of FIG. 1 basically includes a source 10 of parts or studs which are supplied to an escapement mechanism 12 embodying the invention and which are then blown one at a time to a stud welding tool 14. The source 10 of studs is shown in the form of a vibrating bowl 16 having a spiral track 18 up and along which studs or fasteners 20 are moved by a vibratory action. The bowl can contain suitable orienting means to assure that the studs are properly oriented in a predetermined manner when fed to a supply tube 22. The supply tube 22 is shown as a hollow, flexible member but can be any suitable supply track, rigid or flexible, for maintaining the studs in end-to-end relationship.

From the escapement 12, the studs are blown one at a time through a flexible feed tube 24 into a loading chamber 26 of the tool 14. The tool can be substantially the same as that shown in my U.S. Pat. No. 3,339,799 and will not be discussed in detail. The studs can be moved from the loading chamber 26 into a chuck 28 with the aid of a plunger (not shown) operated by an air cylinder 30. After the studs 20 are welded to a workpiece, the tool is pulled therefrom to strip the chuck 28 from the welded stud and ready the tool for another stud to be blown through the feed tube 24.

Referring now in more detail to the escapement 12, a housing 32 of the escapement includes a main block 34 forming a main chamber 36 therein which is closed at one end by an end plate 38 affixed by suitable fasteners 40. A front cover plate 42 is located at the front of the block 34 and is held by four fasteners 44 which can be readily removed for access to the interior of the escapement. A shuttle 46 is located in the main chamber 36 and contains a transverse opening 48 which carries a sleeve 50 forming a stud-receiving passage 52 therein. While without the sleeve, the studs could be received directly in the opening 48, by employing the sleeve 50, the stud passage 52 can be changed by substituting a different sleeve so as to accommodate studs of different diameters, should such be desirable.

When studs of different lengths are to be used, an insert member 54 extending upwardly into the sleeve 50 from the bottom thereof can be changed so that the studs will always, when received in the passage 52, have their upper ends terminating at the upper surface of the shuttle 46. With the studs in this position, there is no necessity for employing special mechanisms, fingers, slides, etc., in connection with the supply tube 22 to feed the studs into the shuttle, as has heretofore been necessary. Rather, the next stud to be fed into the shuttle simply rides on the upper end of the preceding stud and on the upper surface of the shuttle, when the preceding stud is transferred, until that stud had been blown to the tool and the passage 52 is back in position to receive the next stud. The insert 54 has an end flange 56 which is received in an enlarged recess 58 of the shuttle to be held securely therein, and thereby be prevented from moving when air is blown through a central nozzle or passage 60 in the insert member 54.

When studs of a different diameter are to be employed, a supply tube fitting 62 can also be changed to cooperate more closely with the diameter of the new studs. The fitting 62 has a constant outside diameter received in an opening 64 of the block 34 and has an upper flange 66 which rests on top of the block 34. The fitting 62 is held by a clamping plate 68 having a forked end 70 fitting over the flange 64 with an opposite end portion resting on a supporting pin 72. The clamping plate 68 has a central slot 74 which receives a screw fastener 76 threaded into the main block 34. A coiled spring 78 urges the plate 68 upwardly against the enlarged portion of the screw 76 to enable the plate to be readily slid outwardly off the flange 66 when it is desired to remove the fitting 62, simply by loosening the screw 76.

A feed tube fitting 80 also can be changed to suit the diameter of the stud. The fitting 80 is received in an exit opening 82 of the block 34 and has a flange 84 on top of the block. This flange is held by a clamping plate 86 which is essentially similar to the plate 68 and the related components.

For moving the shuttle 46 between its positions in the housing, a clevis 88 is connected to the shuttle by a pin 90 extending into a recess 92 in an end portion of the shuttle. The clevis 88 in turn reciprocates in a semicylindrical passage 94 in the block 34, which passage communicates with the main chamber 36. When the front cover plate 42 is removed, the shuttle 46 can then be directly removed from the front of the block 34 for the purpose of replacing the insert 54 and the sleeve 50, if necessary. A connecting rod 96 connects the clevis 88 with a piston 98 (FIG. 2) in a double-acting cylinder 100 carried by a mounting block 102 on an end of the main block 34. Air is supplied through lines 104 and 106 to the opposite ends of the cylinder 100 to move the piston 98 and to reciprocate the shuttle 46.

In one extreme position of the shuttle, the passage 52 is aligned with the supply tube fitting 62 while in the other extreme position of the shuttle, the passage 52 is aligned with the fitting 80. In the first position, one of the studs 20 drops into the passage 52, if empty. In the second position, the stud is blown upwardly through the fitting 80 and the feed tube 24 to the stud welding tool. The air is supplied through a line 108 and through an opening 110 in the block 34, as well as through the passage 60 in the insert 54, to propel the stud rapidly and efficiently to the tool. Air can be supplied simultaneously to the lines 104 and 108, after which air is supplied to the line 106 to return the shuttle for another stud.

By supplying the studs to the tool from the same side of the escapement at which the studs are received, the studs never pass completely through the passage 52 in the shuttle 46. Consequently, the insert member 54 can be employed to adapt the escapement to studs of any length without the use of complicated mechanism. Further, with this arrangement, flanged studs 112 (FIG. 7) can be fed by the escapement with an enlarged flange 114 of the stud resting on top of the sleeve 50, in which case no insert member is required and flanged studs of different lengths can be employed without any modification of the escapement.

With the supply tube 22 and the feed tube 24 extending upwardly, a potentially dangerous condition exists in the event that the escapement 12 should be operated when the feed tube 24 and the fitting 80 are removed. In such an instance, a stud could be propelled through the opening 82 and injure the operator or some object. To prevent this possibility, the escapement 12 can be provided with a safety lock to prevent operation of the shuttle 46 when the feed tube fitting 80 is removed. Referring to FIGS. 4—6, a locking bar or member 116 is slidably mounted in a horizontal, transverse passage 118 in the block 34 and is urged toward the shuttle 46 by a spring 120 having one end received in a recess 122 of the locking bar and the other end against a cover 124. A release arm 126 extends upwardly above the top of the block 34, through an opening 128 therein.

The locking bar 116 has an extension 130 which engages the side of the fitting 80 under normal conditions, when the fitting 80 is in place in the opening 82. In such a position, the bar 116 is clear of or spaced from the shuttle 46. When the fitting 80 is removed, however, the extension 130 moves into the space defined by the opening 82 and the end of the bar 116 bears against the upper rear surface of the shuttle 46, being urged in such position by the spring 120. When the shuttle 46 is in the first position to receive a stud from the supply tube 22, the end of the bar 116 enters a semicircular notch 132 in the shuttle and the shuttle cannot then move to a position in which a stud carried thereby can be blown through the opening 82, even if air should be supplied to the lines 104 and 108. When the fitting 80 is to be inserted in the opening 82, the release arm 126 can be moved rearwardly, where it is blocked from moving when the fitting 80 is in place. Hence, with this arrangement, any potentially dangerous condition is eliminated.

Various modifications of the above described embodiments of the invention will be apparent to those skilled in the art, and it is to be understood that such modifications can be made without departing from the scope of the invention.

I claim:

1. An escapement for feeding parts comprising a housing, a shuttle capable of moving between two positions in said housing, said shuttle having a part-receiving opening therein, means for moving said shuttle in said housing between its positions, part-supply means for supplying parts to said shuttle opening when said shuttle is in one of it positions, an exit opening and a supply opening in said housing on the same side of said shuttle as said part-supply means, and means for supplying fluid through said shuttle opening towards said exit opening, when said shuttle is in the other of its positions, to move a part in said shuttle opening through said exit opening in a direction opposite to that in which the part moves when entering said shuttle opening and said supply opening, said exit opening and said supply opening being provided with movable fittings.

2. An escapement according to claim 1 characterized further by means in said shuttle opening to limit the extent to which the parts can extend into said shuttle opening.

3. An escapement according to claim 1 characterized by an insert member in said shuttle opening to position an end of each part entering said shuttle opening substantially flush with the surface of said shuttle when the part has reached its maximum travel into said shuttle opening.

4. An escapement according to claim 1 characterized by said fluid-supplying means comprising a passage in said insert member and aligned with said shuttle opening.

5. An escapement according to claim 1 characterized by said shuttle having a removable sleeve defining said shuttle opening whereby said sleeve can be replaced by another to change the diameter of said shuttle opening.

6. An escapement for feeding parts comprising a housing, a shuttle capable of moving between two positions in said housing, said shuttle having a part-receiving opening, means for moving said shuttle in said housing between it positions, supply means for supplying parts to said shuttle opening when said shuttle is in one of its positions, an exit opening in said housing and aligned with said shuttle opening when said shuttle is in the other position, means for directing fluid to move a part from said shuttle opening toward said exit opening, and means engageable with said shuttle when said shuttle opening is aligned with said supply means for preventing said shuttle from moving to the position in which said shuttle opening is aligned with said exit opening.

7. An escapement according to claim 6 characterized by means for urging said engageable means into engagement with said shuttle.

8. An escapement according to claim 7 characterized by means for blocking said urging means from moving said engageable means toward said shuttle.

9. An escapement according to claim 8 wherein said blocking means comprises a fitting for a feed tube, through which the parts are propelled from said exit opening.

10. An escapement according to claim 6 characterized by arm means connected with said engageable means for manually releasing said engageable means from said shuttle.